US010770987B2

(12) United States Patent
Kumar et al.

(10) Patent No.: US 10,770,987 B2
(45) Date of Patent: Sep. 8, 2020

(54) MOTOR DRIVE ARCHITECTURE FOR VARIABLE FREQUENCY ALTERNATING CURRENT LOADS

(71) Applicant: Hamilton Sundstrand Corporation, Charlotte, NC (US)

(72) Inventors: Dhananjay Kumar, Bangalore (IN); Vaibhav Kumar Somani, Bangalore (IN)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 70 days.

(21) Appl. No.: 16/028,652

(22) Filed: Jul. 6, 2018

(65) Prior Publication Data
US 2019/0348924 A1 Nov. 14, 2019

(30) Foreign Application Priority Data
May 11, 2018 (IN) .............................. 201811017863

(51) Int. Cl.
*H02M 5/452* (2006.01)
*H02M 7/487* (2007.01)
(Continued)

(52) U.S. Cl.
CPC ............ *H02M 7/487* (2013.01); *H02H 1/043* (2013.01); *H02H 9/002* (2013.01);
(Continued)

(58) Field of Classification Search
CPC ......... H02H 3/025; H02P 3/22; H02M 7/5395
(Continued)

(56) References Cited

U.S. PATENT DOCUMENTS 6,031,738 A    2/2000   Lipo et al.
7,952,896 B2 *   5/2011   Hu ...................... H02M 5/4585
                                                                363/37
(Continued)

FOREIGN PATENT DOCUMENTS

JP          0799784 A     4/1995
WO    2015094233 A1   6/2015
(Continued)

OTHER PUBLICATIONS

European Search Report Issued for Application No. 19173604.0-1202, dated Sep. 11, 2019, 8 pages.

*Primary Examiner* — Eduardo Colon Santana
*Assistant Examiner* — Zemenay T Truneh
(74) *Attorney, Agent, or Firm* — Cantor Colburn LLP

(57) ABSTRACT

A method and system for controlling a three-phase drive connected to a three phase power source. The method includes connecting a converter to transfer power from the power source to a first direct current (DC) bus, where the converter and the first DC bus each have a neutral common point (NCP). Connecting a second DC bus to the first DC point. Connecting a second DC bus to the first DC bus and configuring an inverter connected to the second DC bus to draw power from the second DC bus to provide a plurality of motor signals, the inverter having an inverter NCP. The method also includes connecting a neutral point selection device to the first DC bus NCP and selectively connecting to the converter NCP or the inverter NCP, the bus selection device configured to disconnect the converter NCP or the inverter NCP from the first DC bus NCP under selected conditions.

18 Claims, 4 Drawing Sheets

(51) Int. Cl.
  *H02H 1/04* (2006.01)
  *H02H 9/00* (2006.01)
  *H02M 5/45* (2006.01)
  *H02M 7/49* (2007.01)
  *H02P 1/16* (2006.01)
  *H02P 27/14* (2006.01)
  *H02M 1/12* (2006.01)
  *H02M 7/5395* (2006.01)
  *H02H 3/02* (2006.01)

(52) U.S. Cl.
  CPC ........... *H02M 5/4505* (2013.01); *H02M 7/49* (2013.01); *H02P 1/16* (2013.01); *H02P 27/14* (2013.01); *H02H 3/025* (2013.01); *H02M 7/5395* (2013.01)

(58) Field of Classification Search
  USPC ................................. 318/424, 380; 363/37
  See application file for complete search history.

(56) References Cited

U.S. PATENT DOCUMENTS

| | | | |
|---|---|---|---|
| 8,811,048 B2 | 8/2014 | Zhang et al. | |
| 9,537,299 B2 * | 1/2017 | Rozman | H02H 3/025 |
| 2014/0300298 A1 * | 10/2014 | Liu | H02P 3/22 |
| | | | 318/380 |
| 2017/0149366 A1 | 5/2017 | Gibbs et al. | |
| 2019/0238062 A1 * | 8/2019 | Lu | H03K 17/122 |

FOREIGN PATENT DOCUMENTS

| | | | |
|---|---|---|---|
| WO | WO-2015094233 A1 * | 6/2015 | |
| WO | 2016100026 A1 | 6/2016 | |

\* cited by examiner

MOTOR DRIVE ARCHITECTURE FOR VARIABLE FREQUENCY ALTERNATING CURRENT LOADS

CROSS-REFERENCE TO RELATED APPLICATIONS

This application claims the benefit of Indian Patent Application No. 201811017863 filed May 11, 2018, which is incorporated herein by reference in its entirety.

BACKGROUND

The subject matter disclosed herein generally relates to a motors and motor control and, more particularly, to a new architecture for a variable frequency variable voltage multilevel drive.

Aircraft systems commonly include a variety of motor controlled systems. For example, motor controlled systems can include actuation systems for control surfaces, aircraft components environmental control systems, and the like. In some systems, such as actuation systems for control surfaces, power quality can impact control systems limit their capability to achieve higher speeds, maintain loads, and design criteria.

Conventional motor drive systems, particularly in an airborne environments, are expected to operate under a variety of input power conditions that commonly exceed specifications. For example, in some instances aircraft power systems can exhibit Total Harmonic Distortions (THD) 30% higher than specified and power factors as low as 0.75. Commonly, these conditions worsen as power loads increase.

Aircraft power generation systems are often configured to regulate the bus voltage and current over a relatively small range of loads. As a result, and especially with very small or very large loads, it is common for aircraft generator systems to not be able to meet the bus regulation as expected. Moreover, in simple passive motor drives, the DC bus formulated from a given AC input varies widely with any variation in the input AC input voltage from an aircraft power generation system. One solution for these issues is to employ motor drives that are oversized/overdesigned and conservatively configured to ensure operations at a variety of input voltage and current ranges. However, oversizing components can be inefficient, and expensive. Similarly, overdesigning or conservatively designing motor drive components usually requires larger and heavier components. Moreover, as power levels increase, passive solutions for motor drives become very bulky and heavy and not well suited to airborne applications, primarily a result of the larger size and weight of magnetics, and the direct current (DC) Link capacitor typically employed in motor drives.

Therefore what is needs is a motor drive capable of providing for increasing speed and torque requirements while operating from power sources that exhibit limited power quality.

BRIEF DESCRIPTION

According to one embodiment described herein is a method and system for controlling a three-phase drive connected to a three phase power source. The method includes connecting a converter to transfer power from the power source to a first direct current (DC) bus, where the converter and the first DC bus each have a neutral common point (NCP). Connecting a second DC bus to the first DC bus and configuring an inverter connected to the second DC bus to draw power from the second DC bus to provide a plurality of motor signals, the inverter having an inverter NCP. The method also includes connecting a neutral point selection device to the first DC bus NCP and selectively connecting to the converter NCP or the inverter NCP, the bus selection device configured to disconnect the converter NCP or the inverter NCP from the first DC bus NCP under selected conditions.

In addition to one or more of the features described above, or as an alternative, further embodiments may include a controller operably connected to the multi-level converter and the inverter, the controller configured to generate control signals to cause the multi-level converter to transfer power to the first DC bus, and generate control signals to cause the inverter to transfer power from the second DC bus to generate a plurality of motor excitation signals.

In addition to one or more of the features described above, or as an alternative, further embodiments may include that the controller generates a pulse width modulation (PWM) signal with a selected duty cycle for the converter control signals based on at least a current loading of the DC bus.

In addition to one or more of the features described above, or as an alternative, further embodiments may include that the controller generates a pulse width modulation (PWM) signal with a selected duty cycle for the inverter control signals based on at least one of a position of the motor, a speed of the motor, and a load of the motor.

In addition to one or more of the features described above, or as an alternative, further embodiments may include a first bus selection device operably connected to the positive terminal of first DC bus and selectively connectable to the positive terminal of second DC bus, and a second bus selection device operably connected to the negative terminal of first DC bus and selectively connectable to the negative terminal of second DC bus, the first and second bus selection devices configured to disconnect the second DC bus from the first DC bus under selected conditions.

In addition to one or more of the features described above, or as an alternative, further embodiments may include that at least one of the first bus selection device and the second bus selection device is at least one of a fuse, a circuit breaker, a contactor, a passive current interruption device, and an active switching device.

In addition to one or more of the features described above, or as an alternative, further embodiments may include that at least one of the first bus selection device and the second bus selection device is operably connected to a controller, and responsive to a control signal from the controller based on at least a current load of the inverter.

In addition to one or more of the features described above, or as an alternative, further embodiments may include that the neutral point selection device is at least one of a fuse, a circuit breaker, a contactor, a passive current interruption device, and an active switching device.

In addition to one or more of the features described above, or as an alternative, further embodiments may include that the neutral point selection device is operably connected to a controller and responsive to a control signal from a controller based on at least one of a current load of the inverter and input current level.

In addition to one or more of the features described above, or as an alternative, further embodiments may include that the converter is a three level, three phase converter, and the inverter is a two level, three phase inverter.

In addition to one or more of the features described above, or as an alternative, further embodiments may include that at least one of the converter and the inverter, is a three level converter or inverter respectively.

In addition to one or more of the features described above, or as an alternative, further embodiments may include that at least one of the converter and the inverter comprise at least six switching devices.

In addition to one or more of the features described above, or as an alternative, further embodiments may include an inrush current limiter.

In addition to one or more of the features described above, or as an alternative, further embodiments may include that the converter is a multilevel converter including an inrush current limiter, the in rush current limiter comprising an bypass diode and series positive temperature coefficient thermistor selectively shunted by a an active switching device.

In addition to one or more of the features described above, or as an alternative, further embodiments may include that the active switching device includes a thyristor operatively connected to a controller and responsive to a control signal from the controller based on a current in the converter.

In addition to one or more of the features described above, or as an alternative, further embodiments may include that the converter neutral point is not electrically connected to the inverter neutral point.

Also described herein in an embodiment is a motor control system with a three-phase active front-end drive including short circuit protection. The three-phase drive including a multi-level converter having a converter neutral common point configured to transfer power from a three-phase alternating current (AC) power source to a first direct current (DC) bus, the first direct current bus having a positive terminal, a negative terminal, and neutral common point, a second DC bus having a positive terminal and a negative terminal, the second DC bus operably connected to the first DC bus, with the positive terminal of the second DC bus operably connected to the positive terminal of the first DC bus, and the negative terminal of the second DC bus operably connected to the negative terminal of the first DC bus, and an inverter operably connected to a second DC bus; the inverter configured to draw power from the positive terminal of the second DC bus and negative terminal of the second DC bus to provide a plurality of motor excitation signals, the inverter having an inverter neutral common point. The three-phase drives also includes a neutral point selection device operably connected to the first DC bus neutral common point of the first DC bus and selectively connectable to at least one of the converter neutral common point and the inverter neutral common point, the bus selection device configured to disconnect the at least one of the converter neutral common point and the inverter neutral common point from the first DC bus neutral common point under selected conditions, and a motor operably connected to the inverter, the motor configured to receive the plurality of motor excitation signals.

In addition to one or more of the features described above, or as an alternative, further embodiments may include a controller operably connected to the multi-level converter as well as the inverter. The controller is configured to generate control signals to cause the multi-level converter to transfer power to the first DC bus, and generate control signals to cause the inverter to transfer power from the second DC bus to generate a plurality of motor excitation signals respectively.

In addition to one or more of the features described above, or as an alternative, further embodiments may include a first bus selection device operably connected to the positive terminal of first DC bus and selectively connectable to the positive terminal of second DC bus, and a second bus selection device operably connected to the negative terminal of first DC bus and selectively connectable to the negative terminal of second DC bus, the first and second bus selection devices configured to disconnect the second DC bus from the first DC bus under selected conditions.

Also described herein in yet another embodiment is a method of controlling a three-phase active front-end drive configured for connection to a three phase alternating current power source. The method includes operably connecting a multi-level converter having a converter neutral common point to transfer power from a three phase alternating current (AC) power source to a first direct current (DC) bus, the first DC bus having a positive terminal, a negative terminal, and a neutral common point, operably connecting a second DC bus to the first DC bus, the second DC bus with a positive terminal of the second DC bus operably connected to the positive terminal of the first DC bus, and a negative terminal of the second DC bus operably connected to the negative terminal of the first DC bus, and configuring an inverter operably connected to the second DC bus to draw power from the positive terminal of the second DC bus and negative terminal of the second DC bus to provide a plurality of motor excitation signals, the inverter having an inverter neutral common point. The method also includes operably connecting a neutral point selection device to the first DC bus neutral common point of the first DC bus and selectively connecting to at least one of the converter neutral common point and the inverter neutral common point, the bus selection device configured to disconnect the at least one of the converter neutral common point and the inverter neutral common point from the first DC bus neutral common point under selected conditions.

The foregoing features and elements may be combined in various combinations without exclusivity, unless expressly indicated otherwise. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
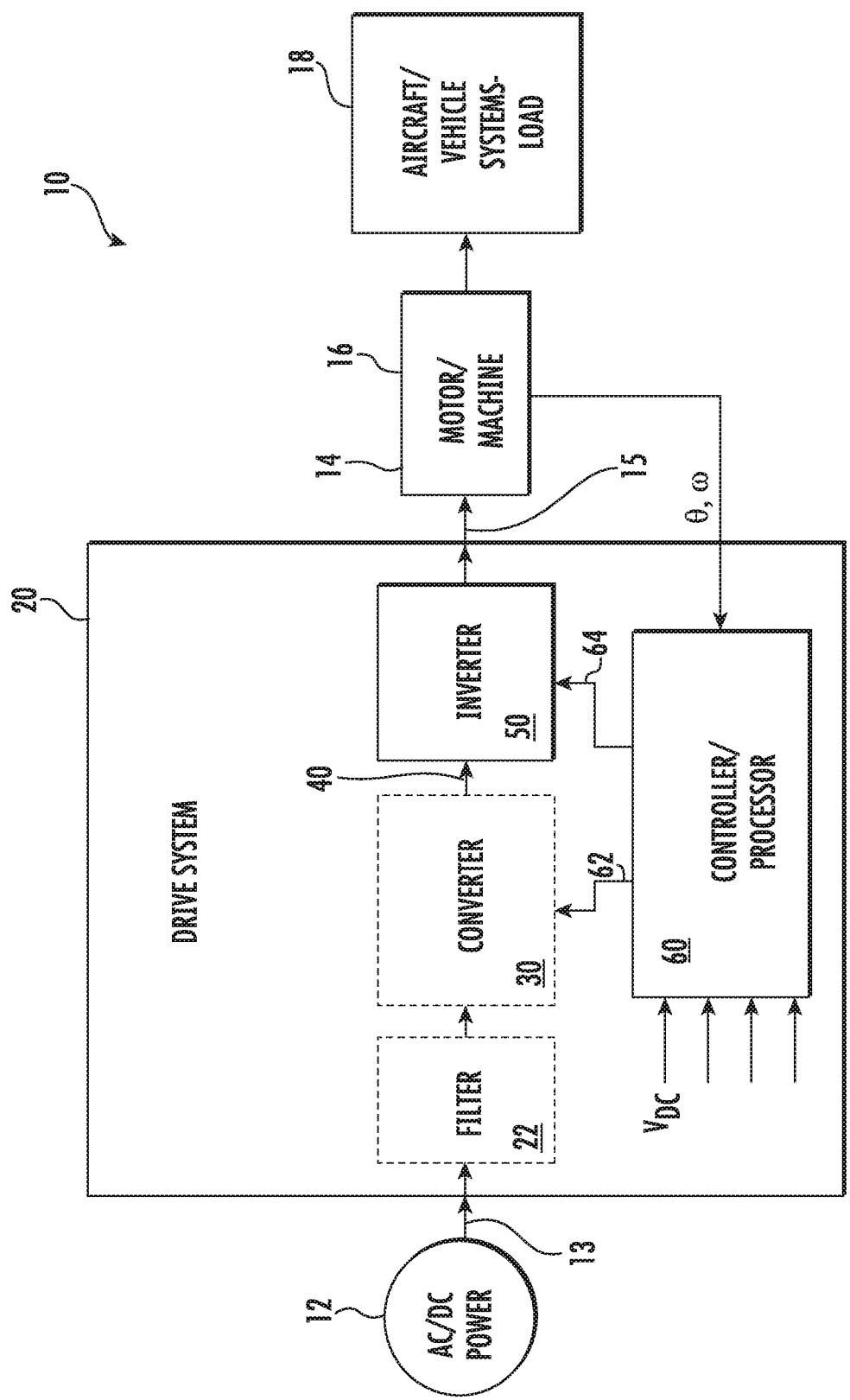
FIG. 1 depicts a high level block diagram of motor drive system in accordance with one or more embodiments.

Embodiments described herein are directed to a variable voltage and frequency driving system for an AC load, including a three-phase active front end rectification module, a multilevel inverter, and a high capacity intelligent DC bus module. The three-phase active front end rectification module is coupled with a three-phase variable frequency drive, for converting an AC Voltage input (grid or AC bus) with a variable operating frequency on the three-phase aircraft generator into a DC voltage to supply the DC bus module. The multilevel inverter is used for converting the DC voltage from the DC bus into an AC Voltage with a required variable frequency, so as to drive a permanent magnet synchronous motor (PMSM), brushless DC motor (BLDC), and/or a switched reluctance motor (SRM).

In one embodiment, the DC bus module also includes one or more high-capacity intelligent capacitors and is coupled between the three-phase active front end rectification module and the multilevel inverter, for temporarily storing energy and maintaining the DC voltage of the DC bus. A three-phase active front-end rectifier is employed in the active front-end rectification module, and a diode-clamped multi-level inverter is adapted correspondingly to provide excitation to the motor. This motor drive architecture is configured to provide higher power density and improved current quality to satisfy the medium scale power drive applications. Advantageously, the described architecture also provides protection for the motor and drive in the event of motor winding shorts, whether phase to another phase short, or to the motor body (earth short Protection).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

Figure 2:
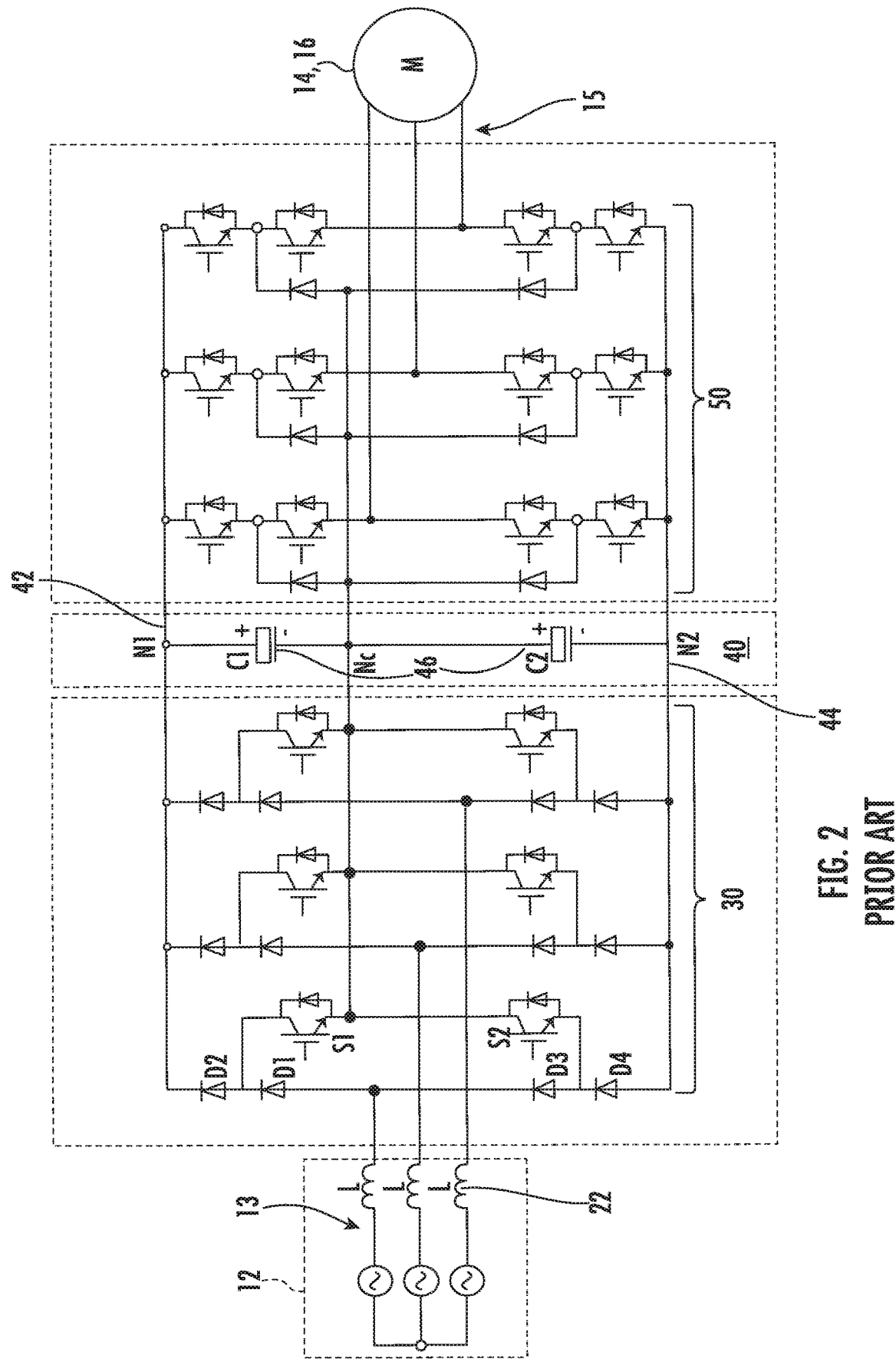
FIG. 2 depicts a more detailed block diagram of a conventional motor drive system employing a multi-level inverter.

FIG. 1 is a block diagram of components of a power system 10 as may be employed to power one or more systems or loads 18. FIG. 2 depicts additional detail of a conventional motor power system and motor drive system 20. The power system 10 is described with respect to an aircraft power system, however application to any system where a three phase or motor drive is employed may be envisioned. Power system 10 includes a source of AC/DC power 12, such as an electrical main line, (e.g., 115/230 volt AC 360-800 Hz, 3-phase) as shown, power bus, DC power bus, battery, and the like. The AC/DC power 12 is provided to a drive system 20.

The drive 20 may include a filter 22 configured to limit inrush currents, stabilizes voltage levels and suppress electromagnetic interference (EMI). The input power signals 13 (not in FIG. 2), once filtered (if employed), are provided to a rectifier and/or converter 30. The converter 30 is configured to convert the AC power 12 to a DC voltage. The converter 30 may also convert a DC voltage input to a different level DC voltage as may be required in the drive 20. In an embodiment, the converter 30 is active and may be a single or multi-level configuration. The converter 30 could also be a simple passive rectifier, e.g., a diode bridge configured to rectify an AC voltage input to a DC voltage. The output of the converter 30 supplies a DC bus 40. A filter 46 (FIG. 2) may be employed stabilizing the DC bus 40 from transients and to suppress EMI as is conventionally known.

The illustrated drive 20 also includes an inverter 50 to convert the DC voltage on the DC bus 40 to multiphase, AC drive motor command signals 15. Motor command signals 15 from the inverter 50 of the drive system 20 are supplied to a multiphase machine 14. For example, a motor 16 to impart motion to a control surface, power an environmental control system, and the like. In an exemplary embodiment, machine 14 includes, but is not limited to a multiphase, permanent magnet synchronous motor 16. It should also be appreciated, that while the embodiments herein are described primarily with reference to an aircraft electrical system and application, this description is for example only. The embodiments described here are readily applied to any application employing a three phase drive with a multiphase sine drive motor power application including motor controls, environmental control, control surface actuation, and any other power system and motor control application.

Both rectifier/converter 30 (if an active type) and inverter 50, are controlled by a controller 60. In an alternative embodiment, converter 30 and inverter 50 may be controlled by separate drive controllers, 60. The controller 60 may provide control signals 62 to the switching devices (not shown) of the active rectifier or converter 30 to control generation and maintenance of the DC voltage on the DC bus 40. Likewise controller(s) 60 provides control signals 64 to the switching devices (not shown) of the inverter 50 to control generation of the motor command signals 15.

In operation, employing an active converter 30, the controller 60 develops a DC current command for the converter 30 based on the operation the motor 16 and the inverter 50 generating the motor command signals 15. The DC current command is then employed to formulate the PWM control commands 62 for the switching devices of the converter 30 to provide a DC output current to the DC bus 40 accordingly. In addition, the controller 60 receives various input signals or values, including set point signals or values for desired output operation, such as DC bus voltage, motor speed ω, position θ, torque, etc., as well as feedback signals or values representing operational values of various portions of the motor drive 20. In another embodiment, a passive rectifier configuration for the converter 30 is employed and no PWM commands from the controller 60 are needed. While such a configuration is advantageous because of its simplicity for employing passive rectifiers to supply the DC bus 40, other configurations with an active converter 30 may be desirable for improved current and electromagnetic interference (EMI) control. Likewise, the controller 60 develops a command for the inverter 50 based on the operation the motor 16 e.g., motor speed ω, torque, and the like, and the inverter 50 generating the motor command signals 15. The command is then employed to formulate the PWM control commands 64 for the switching devices of the inverter 50 to formulate the motor command signals 15 accordingly.

Conventionally a pulse width modulation (PWM) control scheme is employed to command the switching devices of the converter 30 to supply the DC bus 40 and the inverter 50 to generate and control the motor command signals 15 to the motor 16. Conventionally, such a PWM control scheme employs space vector pulse width modulation (SVPWM) techniques. Moreover, conventionally the SVPWM for the converter 30 (if active) and inverter 50 would be operated at the same frequency and synchronized. Synchronization of the PWM for both the converter 30 and the inverter 50 from the controller 60 improves functions and reduces generated EMI from the operation of the switching devices of the converter 30 and inverter 50).

However, in some applications, other PWM techniques may be employed to address the advantages and constraints imposed by the construction or particular implementation of the converter 30 or inverter 50. For example, bus clamping conventional discontinuous (DPWM) or even hybrid SVPWM techniques. Hybrid SVPWM is effectively a combination of conventional continuous SVPWM and DPWM techniques. Moreover, while it is well known that increasing switching frequency facilitates reductions in the size of magnetics, filters, improves acoustics, and the like, it does result in increased switching losses in the switching devices for the converter 30 or for the switching devices of the inverter 50. Therefore, in some embodiments, particularly where an active converter 30 is employed it may be advantageous to operate the converter 30 at a different PWM frequency than those of the inverter 50 or with a different PWM scheme than the inverter 50. Moreover, while SVPWM though is less efficient, it is effective for most applications, yet employing conventional discontinuous (DPWM) or hybrid SVPWM improves efficiency in selected instances. Therefore, employing DPWM, or a hybrid SVPWM results improved efficiency at the expense of current sensing quality. Finally, for the inverter 50, in applications where torque/current control are important, low current distortion (and thereby low torque ripple) is commonly desired. As such, continuous SVPWM or hybrid SVPWM techniques are conventionally employed to ensure good motor response. In the embodiments as described herein conventional SVPWM techniques are employed.

Figure 3:
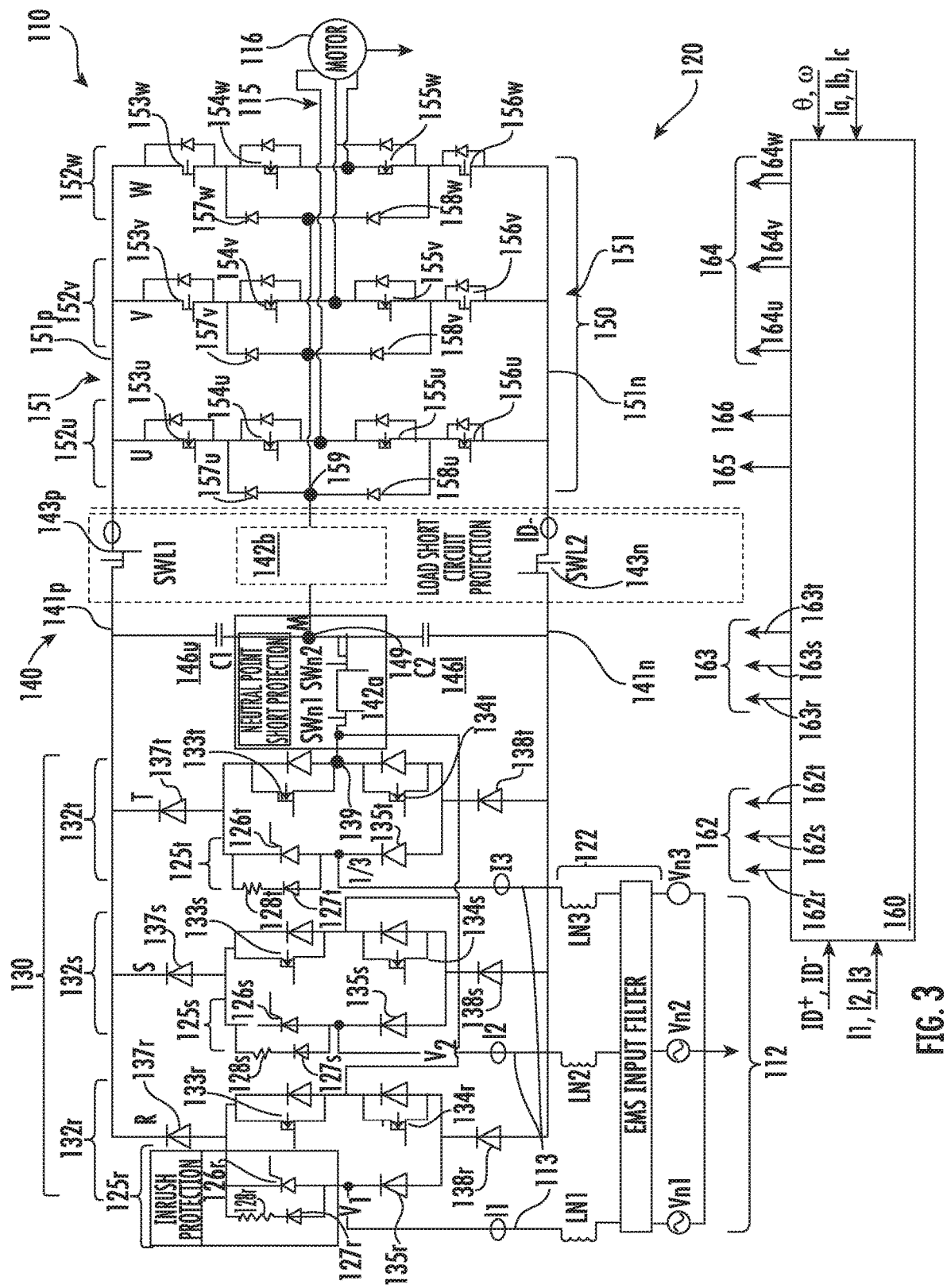
FIG. 3 depicts a more detailed block diagram of a motor drive system in accordance with one or more embodiments.

Turning now to FIG. 3, a more detailed block diagram of a power system 110 in accordance with one or more embodiments is shown. Like the power system 10 above, the power system 110 is described with respect to an aircraft power system, however application to any system where a three phase or motor drive is employed may be envisioned. Power system 110 includes a source of AC/DC power 112, such as an electrical main line, (e.g., 115/230V volt AC 360-800 Hz, 3-phase) as shown, power bus, DC power bus, battery, and the like. The AC/DC power 112 is provided to a drive system 120. The drive 120 may include a filter 122 configured to limit inrush currents, stabilize voltage levels and suppress electromagnetic interference (EMI). The input power signals 113, once filtered (if employed), are provided to a rectifier and/or converter 130. The converter 130 is configured to convert the AC power 112 to a DC voltage. As described above, the converter 130 may also convert a DC voltage input to a different level DC voltage as may be required in the drive 120. In an embodiment, the converter 130 is active and may be a single or multi-level configuration. In an embodiment, drive system 120 includes a converter 130 having 3 phase legs, 132r, 132s, and 132t also denoted as R, S, and T respectively in a multi-level (three-level) configuration. In an embodiment, each phase leg, R, S, and T, (132r, 132s, and 132t) includes an active inrush current limit device 125r, 125s, 125t respectively cascaded with another rectifier 137r, 137s, 137t to feed current from the input power 112 to DC bus 140. In an embodiment the inrush current limit device 125r, 125s, 125t comprises a diode 127r, 127s, 127t and positive temperature coefficient thermistor 128r, 128s, 128t in series, which is then placed in parallel with bypass devices 126r, 126s, and 126t. Each current limit device 125r, 125s, 125t placed in series with each phase of the input power signals 113 respectively for each phase leg 132r, 132s, and 132t respectively, though other configurations are possible. Bypass devices 126r, 126s, and 126t are employed and active for normal operation when the current limiting is not employed. In an embodiment, the bypass devices are thyristors configured to receive a control signal 163r, 163s, 163t from the controller 160 deactivate the bypass devices 126r, 126s, 126t to limit inrush current under selected conditions. For example, at power up, the bypass devices 126r, 126s, 126t are not active. As a result, current is directed to flow through diode(s) 127r, 127s, 127t and the thermistor(s) 128r, 128s, 128t until the DC bus 140 and storage devices 146u and 146l are fully charged to a selected level (e.g., the peak voltage of the input power 112) for maintaining the DC bus 140. Once the DC bus 140 has reached a selected charge level, the bypass device 126r, 126s, and 126t is activated and the current limiting is disabled. Each phase leg, R, S, and T, (132r, 132s, and 132t) also includes switching devices 133r, 134r; 133s, 134s; and 133t, 134t respectively controlled by control signals 162 denoted as 162r, 162s, and 162t respectively from a drive controller (160) to control conversion of the AC power from the three phase excitation source 112 to DC power across a DC bus 140 as is conventionally known for multi-level converters. The common points of switching devices 133r and 134r, 133s and 134s, 133t and 134t are each connected together and form the common or neutral point 139 of the converter 130. The three phase filtered power output from filter 122 is connected to the midpoint of series connected bypass devices 126r, 126s, 126t and diodes 135r, 135s, and 135t for each leg 132r, 132s, 132t respectively. That is, for the first leg 132r, the parallel combination of series connected diodes 135r, 135s, 135t and bypass devices 126r, 126s, 126t, with series connected switching devices 133r and 134r are further in series with diodes 137r and 138r respectively in each leg 132r, 132s, 132t combination. Likewise configurations are employed for the legs 132s and 132t respectively.

The output of the converter 130 supplies a DC bus 140 with positive terminal 141p and negative terminal 141n. A filter comprised to an upper capacitor 146u and a lower capacitor 146l may be employed stabilizing the DC bus 140 from transients and to suppress EMI between terminals 141p and 141n as is conventionally known. The common point of the two capacitors 146u and 146l is known as the neutral point 149 for the DC bus 140. The illustrated drive 120 of an exemplary embodiment also includes an inverter 150 similar to inverter 50 described above to convert the DC voltage on a second DC bus 151 to multiphase, AC drive motor command signals 115. The inverter 150 generally having 3 phase legs generally referred to as U, V, and W and also denoted 152u, 152v, and 152w having a plurality of switching devices, at least an upper and lower switching device for each phase leg 152u, 152v, and 152w respectively. In an embodiment the inverter 150 is a multilevel configuration. In a multi-level configuration each phase leg 152u, 152v, and 152w includes cascaded switching devices 153u, 154u; 153v, 154v; and 153w, 154w respectively, for the upper devices and cascaded switching devices 155u, 156u; 155v, 156v; and 155w, 156w respectively, for the lower switching devices. The common points of switching devices 154u and 155u 154v and 155v, 154w and 155w form the output of the inverter 150 and are each connected to the respective phases of the motor 116.

Furthermore, the common points of upper switching devices 153*u* and 154*u* 153*v* and 154*v*, 153*w* and 154*w* are each connected to the cathode of three upper diodes 157*u*, 157*v*, and 157*w* respectively. Similarly, the common points of lower cascaded switching devices 155*u* and 156*u*, 155*v* and 156*v*, 155*w* and 156*w*, respectively, are each connected to the anodes of three lower diodes 158*u*, 158*v*, and 158*w*. In addition, the anodes of the three upper diodes 157*u*, 157*v*, and 157*w* are each connected to the cathodes of the three lower diodes 158*u*, 158*v*, and 158*w* respectively, and each connected to the neutral point common 159 for the inverter 150 which is also selectively connected to the common point 149 of the filter capacitors 146*u* and 146*l* and/or the DC bus 140. As is commonly appreciated, use of a multi-level inverter facilitates operating at higher bus voltages and/or reduces the voltage stresses on the switching devices e.g., 153, 154, 155, 156 and thereby facilitates flexibility in operation of the drive and derating under selected circumstances. Application of the multi-level drive also facilitates connection and isolation of the neutral points e.g. 139, 149, 159 through the system which reduced common mode currents, and load imbalances being reflected back to the power source 112. All of the switching devices are controlled by control signals 164, i.e., 164*u*, 164*v*, and 164*w* from a drive controller 160 to convert DC power across the second DC bus 151, to motor command signals 115 to power motor 116 (See also FIG. 1).

In an embodiment both converter 130 and inverter 150, are controlled by a controller 160. In an alternative embodiment, converter 130 and inverter 150 may be controlled by separate drive controllers, 160. Drive controller 160 may be implemented using a general-purpose microprocessor executing a computer program stored on a non-transitory storage medium to perform the operations described herein. Alternatively, drive controller 160 may be implemented in hardware (e.g., ASIC, FPGA) or in a combination of hardware/software.

In operation, in embodiments employing an active converter 130, the controller 160 develops a DC current command for the converter 130 based on the operation the motor 116 and the inverter 150 generating the motor command signals 115. The DC current command is then employed to formulate the PWM control commands 162 for the switching devices (not shown) of the converter 130 to provide a DC output current to the DC bus 140 accordingly. In addition, the controller 160 receives various input signals or values, including set point signals or values for desired output operation, such as DC bus voltage, motor speed ω, position θ, torque, etc., as well as feedback signals or values representing operational values of various portions of the motor drive 120. Moreover, in an embodiment, it may be desirable to employ an active converter 130 for inrush current control and improved stabilization of the DC bus 140 as will be described at a later point herein. Likewise, the controller 160 develops a command for the inverter 150 based on the operation the motor 116 e.g., motor speed ω, torque, and the like, and the inverter 150 generating the motor command signals 115. The command is then employed to formulate the PWM control commands 164 for the switching devices of the inverter 150 to formulate the motor command signals 115 accordingly.

Motor command signals 115 from the inverter 150 of the drive system 120 are supplied to a multiphase machine. For example, a motor 116 to impart motion to a control surface, power an environmental control system, and the like. In an exemplary embodiment, machine includes, but is not limited to a multiphase, permanent magnet synchronous motor 116. It should also be appreciated, that while the embodiments herein are described primarily with reference to an aircraft electrical system and application, this description is for example only. The embodiments described here are readily applied to any application employing a three phase drive with a multiphase phase sine drive motor, brushless DC motor, or switched reluctance motor, in any power application including motor controls, environmental control, control surface actuation, and any other power system and motor control application.

Continuing with FIG. 1, and FIG. 3 as well, the inverter 150 receives the phase voltage modulation demands e.g., control signals 164 from the PWM generation unit of the controller 160 and converts the direct current (DC) power into alternating current (AC) power. In this example, the inverter 150 represents a three-phase inverter that converts DC power from the second DC bus 151 (and thereby the first DC bus 140) into three-phase AC power which is provided to the motor 116. The inverter 150 includes any suitable structure for converting power from the second DC bus 151 to the AC voltage signals to form phase voltage motor command signals 115 to the motor 116. For example, the inverter 150 could include one or more switches devices FETs or IGBT with antiparallel diodes driven using pulse width modulation (PWM) signals as described above.

The motor 116, in one embodiment, is a permanent magnet motor that operates using the voltages provided by the inverter 150. The motor 116 in a rotary configuration, includes a rotor with magnets embedded in or connected to the rotor. The motor 116 also includes a stator with multiple teeth around which conductive windings are wound. The windings are selectively energized and de-energized based on the signals from the inverter 150, which creates a rotating magnetic field that causes the rotor to rotate. The motor 116 drives a machine 14. The motor 116 can drive the machine e.g., 14 (FIG. 1) with, for example, a drive shaft and one or more gears. Likewise, in linear applications the stator is linearly arranged once again selectively energized and de-energized based on signals from the inverter 150, which causes a translation of forces that moves the secondary.

Continuing FIG. 3, in an embodiment the motor drive 120 is configured to provide neutral point isolation and neutral point short circuit protection. The common point 149 of the DC bus 140 is selectively connectable to the neutral point 139 of the converter 130. In an embodiment at least one selection device 142*a* is employed to selectively connect the neutral point 139 of the converter 130 with the neutral point 159 of the inverter 150 and thereby the neutral point 149 of the DC bus 140. In an embodiment the selection device is a switching device e.g. FET, thyristor, IGBT, relay, contactor, circuit breaker and the like. In another embodiment, the connection device could be passive e.g., fuse, and configured only to interrupt the connection between the neutral point 139 and the neutral point 159 to isolate the inverter 150 from the converter 130. In yet another embodiment the at least one selection device 142*b* is optionally employed to selectively connect the neutral point 139 of the converter 130 and the neutral point 149 of the DC bus 140 with the neutral point 159 of the inverter 150 and thereby selectively electing to position the neutral point isolation on either side of the neutral point 149 for the DC bus 140. In an embodiment the selection device is a switching device controllable by the controller 160, in another device the connection device could be a fuse, or other circuit breaking device. A control signal 165 from the controller 160 is configured to activate and deactivate the selection device 142. Neutral point isolation may be employed at any instant of operation of the motor drive 120 where a neutral point fault such as a short or partial short of a winding is detected or suspected based on the load current and/or input current to the drive system 120. In such instances isolating the neutral points ensures that imbalances resultant from the motor 116 are not transmitted back to the voltage input 112. Moreover, the neutral point isolation may be employed during fault of the upper switching devices, e.g., 133r, 133s, 133t or in instances of a short of a lower switching device 134r, 134s, or 134t.

Continuing FIG. 3, in an embodiment the motor drive 120 is configured to selectively provide DC bus isolation and load short circuit protection. The positive terminal 141p of the DC bus 140 is configured to be selectively isolated from the positive terminal 151p where the inverter 150 draws power from the second DC bus 151. Likewise, the negative terminal 141n of the DC bus 140 is configured to be isolated from the negative terminal 151n where the inverter 150 draws power from the second DC bus 151. In an embodiment at least one selection device 143p, is employed for the positive terminal 151p connection. Likewise, a selection device 143n, is employed for the negative terminal 151n connection. In an embodiment the selection device 143p, 143n is a switching device e.g. FET, thyristor, IGBT, relay, contactor circuit breaker, and the like. A control signal 166 from the controller 160 is configured to activate and deactivate the selection device(s) 143p, 143n. In another embodiment, the selection device 143p, 143n could be passive, e.g., a fuse, and configured only to interrupt the connection between the positive terminals 141p, 151p as well as the negative terminals 141n and 151n to isolate the second DC bus 151 and the inverter 150 from the converter 130 and the DC bus 140. The DC bus 140 and converter isolation may be employed at any instant of operation of the motor drive 120 where a load or motor fault such as a short or partial short of a winding or winding to ground is detected or suspected. In such instances, isolating the second DC bus 151, inverter 150, and load e.g., motor 116 avoids any further damage that may be resultant from a fault and ensures that high current loads resultant from a fault from the motor 116 are not transmitted back to the DC bus 140, converter, 130 and ultimately the voltage input 112.

Figure 4:
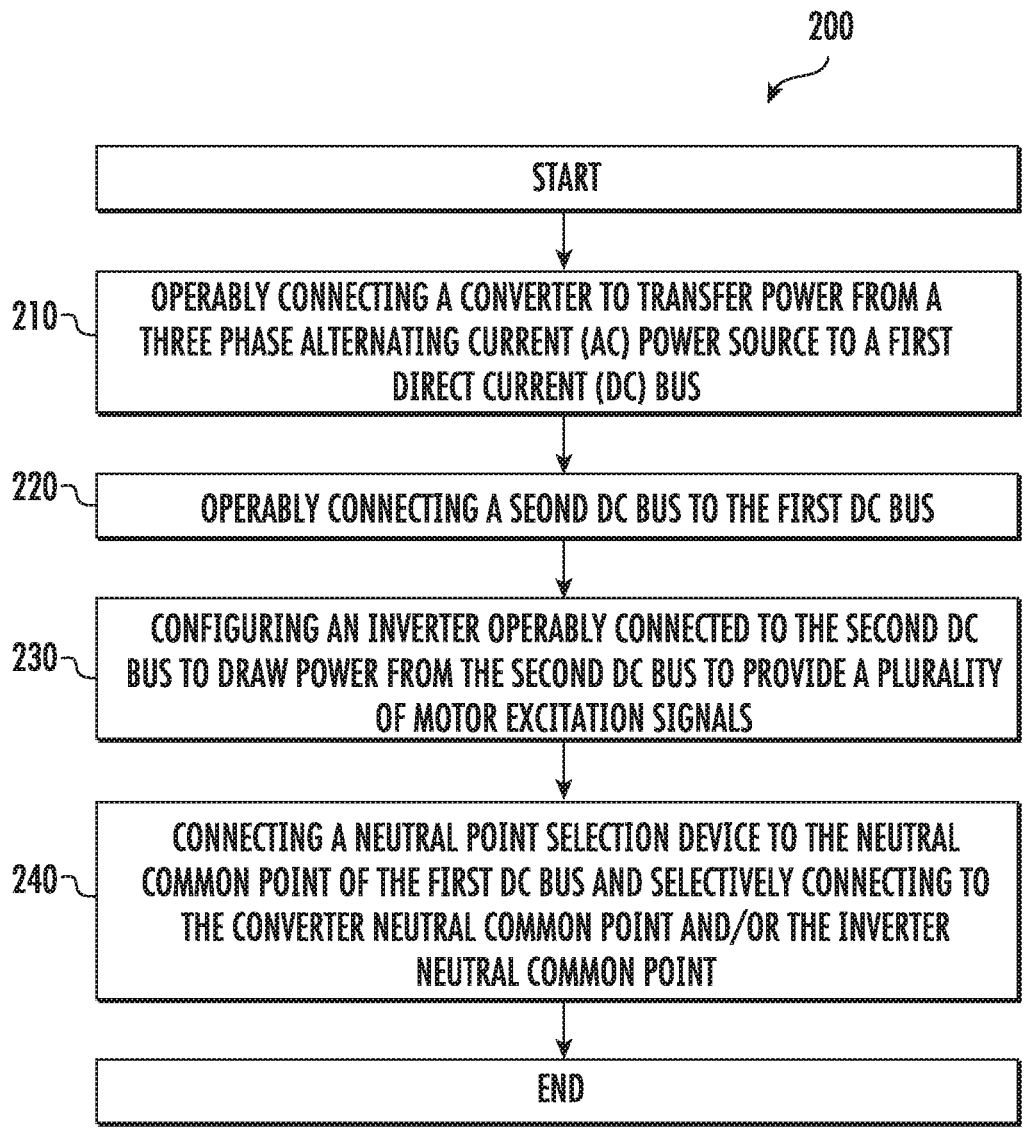
FIG. 4 is a flowchart of a method of controlling a three-phase active front-end drive configured for connection to a three phase alternating current power source in accordance with one or more embodiments.

FIG. 4 is a flowchart of a method 200 of controlling a three-phase active front-end drive configured for connection to a three phase alternating current power source in accordance with an embodiment. One or more steps of the method may be implemented by controller 160 of the control system 110 as described herein. Moreover, some steps of the method 200 may be implemented as software or algorithms operating on the controller 160 as is conventionally known. The method 200 initiates with operably connecting a multi-level converter 130 to transfer power from a three phase alternating current (AC) power source 112 to a positive terminal 141p and negative terminal 141n of a first direct current (DC) bus 140 respectively, as depicted at process step 210. The multi-level converter 130 has a converter neutral common point 139 and the first DC bus 140 also having a first DC bus neutral common point 149 as described above. At process step 220 the method 200 continues with operably connecting a second DC bus 151 to the first DC bus 140. The second DC bus 151 having a positive terminal 151p operably connected to the positive terminal 141p of the first DC bus 140, and a negative terminal 151n of the second DC bus 151 operably connected to the negative terminal 141n of the first DC bus 140. Further, the method 200 includes configuring an inverter 150 operably connected to the second DC bus 151 to draw power from the positive terminal 151p of the second DC bus 151 and negative terminal 151n of the second DC bus 151 to provide a plurality of motor excitation signals 115 as depicted at process step 230 and as described above. The inverter 150 also having an inverter neutral common point 159. Finally, as depicted at process step 240, the method 200 includes operably connecting a neutral point selection device 142 to the first DC bus neutral common point 149 of the first DC bus 140 and selectively connecting to the converter neutral common point 139 and/or the inverter neutral common point 159. In an embodiment, the bus selection device 142 is configured to disconnect the converter neutral common point 139 and/or the inverter neutral common point 159 from the first DC bus neutral common point 149 under selected conditions. The selected conditions may include a motor 116 fault, short circuit, over current and the like.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A three-phase active front-end motor drive system with short circuit protection, the drive system comprising:
   a multi-level converter having a converter neutral common point configured to transfer power from a three-phase alternating current (AC) power source to a first direct current (DC) bus, the first direct current bus having a positive terminal, a negative terminal, and a neutral common point;
   a second DC bus having a positive terminal and a negative terminal, the second DC bus operably connected to the first DC bus, with the positive terminal of the second DC bus operably connected to the positive terminal of the first DC bus, and the negative terminal of the second DC bus operably connected to the negative terminal of the first DC bus;
   an inverter operably connected to the second DC bus, the inverter configured to draw power from the positive terminal of the second DC bus and negative terminal of the second DC bus to provide a plurality of motor excitation signals, the inverter having an inverter neutral common point;
   a neutral point selection device operably connected to the first DC bus neutral common point of the first DC bus and selectively connectable to at least one of the converter neutral common point and the inverter neutral common point, the bus selection device configured to disconnect the at least one of the converter neutral common point and the inverter neutral common point from the first DC bus neutral common point under selected conditions; and
   an inrush current limiter, wherein the converter is a multilevel converter including the inrush current limiter, the inrush current limiter comprises a bypass diode and a series positive temperature coefficient thermistor selectively shunted by an active switching device.

2. The three-phase active front-end motor drive of claim 1, further comprising
   a controller operably connected to the multi-level converter and the inverter, the controller configured to:
   generate control signals to cause the multi-level converter to transfer power to the first DC bus; and
   generate control signals to cause the inverter to transfer power from the second DC bus to generate a plurality of motor excitation signals.

3. The three-phase active front-end motor drive of claim 2, wherein the controller generates a pulse width modulation (PWM) signal with a selected duty cycle for the converter control signals based on at least a current loading of the DC bus.

4. The three-phase active front-end motor drive of claim 2, wherein the controller generates a pulse width modulation (PWM) signal with a selected duty cycle for the inverter control signals based on at least one of a position of the motor, a speed of the motor, and a load of the motor.

5. The three-phase active front-end motor drive of claim 1, further including a first bus selection device operably connected to the positive terminal of first DC bus and selectively connectable to the positive terminal of second DC bus, and a second bus selection device operably connected to the negative terminal of first DC bus and selectively connectable to the negative terminal of second DC bus, the first and second bus selection devices configured to disconnect the second DC bus from the first DC bus under selected conditions.

6. The three-phase active front-end motor drive of claim 5, wherein at least one of the first bus selection device and the second bus selection device is at least one of a fuse, a circuit breaker, a contactor, a passive current interruption device, and an active switching device.

7. The three-phase active front-end motor drive of claim 6, wherein at least one of the first bus selection device and the second bus selection device is operably connected to a controller, and responsive to a control signal from the controller based on at least a current load of the inverter.

8. The three-phase active front-end motor drive of claim 1, wherein the neutral point selection device is at least one of a fuse, a circuit breaker, a contactor, a passive current interruption device, and an active switching device.

9. The three-phase active front-end motor drive of claim 8, wherein the neutral point selection device is operably connected to a controller and responsive to a control signal from a controller based on at least one of a current load of the inverter and input current level.

10. The three-phase active front-end motor drive of claim 1, wherein the converter is a three level, three phase converter, and the inverter is a two level, three phase inverter.

11. The three-phase active front-end motor drive of claim 1, wherein at least one of the converter and the inverter, is a three level converter or inverter respectively.

12. The three-phase active front-end motor drive of claim 1, wherein at least one of the converter and the inverter comprise at least six switching devices.

13. The three-phase active front-end motor drive of claim 1, wherein the active switching device incudes a thyristor operatively connected to a controller and responsive to a control signal from the controller based on a current in the converter.

14. The three-phase active front-end motor drive of claim 1, wherein the converter neutral point is not electrically connected to the inverter neutral point.

15. A motor control system with a three-phase active front-end drive including short circuit protection, comprising:
   a multi-level converter having a converter neutral common point configured to transfer power from a three-phase alternating current (AC) power source to a first direct current (DC) bus, the first direct current bus having a positive terminal, a negative terminal, and neutral common point;
   a second DC bus having a positive terminal and a negative terminal, the second DC bus operably connected to the first DC bus, with the positive terminal of the second DC bus operably connected to the positive terminal of the first DC bus, and the negative terminal of the second DC bus operably connected to the negative terminal of the first DC bus;
   an inverter operably connected to a second DC bus; the inverter configured to draw power from the positive terminal of the second DC bus and negative terminal of the second DC bus to provide a plurality of motor excitation signals, the inverter having an inverter neutral common point;
   a neutral point selection device operably connected to the first DC bus neutral common point of the first DC bus and selectively connectable to at least one of the converter neutral common point and the inverter neutral common point, the bus selection device configured to disconnect the at least one of the converter neutral common point and the inverter neutral common point from the first DC bus neutral common point under selected conditions;

a motor operably connected to the inverter, the motor configured to receive the plurality of motor excitation signals; and an inrush current limiter, wherein the multilevel converter includes the inrush current limiter, the inrush current limiter comprises a bypass diode and a series positive temperature coefficient thermistor selectively shunted by an active switching device.

16. The motor control system of claim 15, further comprising:

a controller operably connected to the multi-level converter as well as the inverter, the controller configured to:

generate control signals to cause the multi-level converter to transfer power to the first DC bus; and generate control signals to cause the inverter to transfer power from the second DC bus to generate a plurality of motor excitation signals respectively.

17. The motor control system of claim 15, further including a first bus selection device operably connected to the positive terminal of first DC bus and selectively connectable to the positive terminal of second DC bus, and a second bus selection device operably connected to the negative terminal of first DC bus and selectively connectable to the negative terminal of second DC bus, the first and second bus selection devices configured to disconnect the second DC bus from the first DC bus under selected conditions.

18. A method of controlling a three-phase active front-end drive configured for connection to a three phase alternating current power source; the method comprising:

operably connecting a multi-level converter having a converter neutral common point to transfer power from the three phase alternating current (AC) power source to a first direct current (DC) bus, the first DC bus having a positive terminal, a negative terminal, and a neutral common point;

operably connecting a second DC bus to the first DC bus, the second DC bus with a positive terminal of the second DC bus operably connected to the positive terminal of the first DC bus , and a negative terminal of the second DC bus operably connected to the negative terminal of the first DC bus;

configuring an inverter operably connected to the second DC bus to draw power from the positive terminal of the second DC bus and negative terminal of the second DC bus to provide a plurality of motor excitation signals, the inverter having an inverter neutral common point; and operably connecting a neutral point selection device to the first DC bus neutral common point of the first DC bus and selectively connecting to at least one of the converter neutral common point and the inverter neutral common point, the bus selection device configured to disconnect the at least one of the converter neutral common point and the inverter neutral common point from the first DC bus neutral common point under selected conditions, wherein the multilevel converter comprises an inrush current limiter, the inrush current limiter comprises a bypass diode and a series positive temperature coefficient thermistor selectively shunted by an active switching device.

* * * * *